Patented Feb. 7, 1950

2,496,566

UNITED STATES PATENT OFFICE 2,496,566

WATER-VAPOR RESISTANT COATED PAPER

Alexander Szwarc, Montreal, Quebec, Canada

No Drawing. Application October 19, 1946,
Serial No. 704,536

2 Claims. (Cl. 117—155)

1

This invention relates to the preparation of kraft paper used in the manufacture of flexible water-vapor proof products characterized by a high degree of water resistance and by other desirable physical and chemical properties adapting such products to the requirements of a wide range of commercial applications.

The water-vapor proof compound provided for use in this invention may be described as a plasticised resin-asphalt wax compound applicable to paper to provide thereon a continuous, flexible, water resistant film which withstands creasing and folding without rupture or cracking; retains its flexibility at temperatures as low as −50° F.; is characterized by exceptionally low water-vapor transmission; withstands prolonged exposure to weather, fumes, alcohol and brine without appreciable deterioration; is non-blocking; and lends itself to the incorporation therein of suitable fungicides.

Compounds prepared for use in accordance with the invention preferably comprise a mixture of mineral rubber, coumarone-indene resin, a rosin plasticiser, paraffin wax and optionally a fungicide.

The mineral rubber preferably employed is a bituminous or asphalt product having a melting point of from 320° F. to 350° F. This ingredient may constitute from 50% to 80% of the compound but is preferably kept within the narrower range of 73% to 80%.

The coumarone-indene resin is a mixture of polymerised coumarone and polymerised indene obtained from solvent naphtha fractions of coal tar at 280° F. to 340° F. This ingredient may constitute from 10% to 25% of the compound but is preferably kept within the narrower range of 12% to 15%. It is compatible with the mineral rubber and serves to improve the pliability, toughness, water resistance and water-vapor resistance of the protective film afforded by the compound when the latter is applied as a film-forming coating to kraft paper.

The rosin plasticiser employed is preferably methyl ester of rosin or hydrogenated methyl ester of rosin. This ingredient may comprise 2% to 10% of the compound but is preferably kept within the narrower range of 2% to 5%. It serves to improve the flexibility of the protective film afforded by the compound and to maintain the flexibility of said film at very low temperatures such as −50° F.

The paraffin wax employed is preferably a solid

2 mixture of purified petroleum hydrocarbons melting between 122° F. to 150° F. This ingredient may comprise 4% to 7% of the compound and serves to improve the non-tacky quality of the protective film formed by the compound.

The fungicide employed is preferably copper naphthenate which is compatible with the other ingredients and may constitute 0.5% to 1% of the compound. This ingredient gives the film fungus proof properties effective against the growth of chaetonium globosum and aspergillus niger.

The above ingredients are blended at a temperature sufficient to render the resin-asphalt fluid and to provide a plasticised resin-asphalt wax compound capable of being readily applied to one or both sides of a base sheet of kraft paper, to form thereon a continuous protective film having the flexibility, water resistance, water-vapor resistance and other desirable physical and chemical properties previously referred to.

One important application of the present invention is in the manufacture of a substantially improved waterproof paper of the type described in U. S. Patent No. 1,667,691, granted April 24, 1928. Such waterproof papers, while exhibiting satisfactory water resistance under certain conditions of use, are not sufficiently impermeable to water and vapor and the protective film thereon is not sufficiently tough and flexible to withstand creasing of the paper without cracking or rupturing and thereby reducing its waterproofing efficiency. The protective film applied to such papers is also open to the objection that it tends to become excessively brittle at moderately low temperature and will not retain satisfactory flexibility at temperatures in the neighborhood of −50° F.

By applying my improved proofing compound as hereinafter described it is possible to produce coated paper having a continuous protective film which, while of an asphalt nature similar to the proofing material of paper produced in accordance with U. S. Patent 1,667,691, is continuous over the surface of the sheet, exhibits superior moisture, vapor, and water resistance; retains its flexibility at temperatures as low as −50° F. and is sufficiently tough and pliable to withstand sharp creasing of the paper without rupturing and cracking.

In using my compound for kraft paper, the best results are obtained by the following procedure:

A roll of paper is mounted on a roll stand fitted with friction brakes and with a lining device so that the paper may be withdrawn from the roll in a perfectly flat and even condition. As it is drawn from the roll the paper sheet is passed over one or more dryers to appreciably reduce the moisture content of the sheet and to secure uniform dryness by levelling out any uneven strips of moisture that the sheet may contain. This preliminary drying of the paper is important in that it facilitates subsequent satisfactory infusion of the paper by the proofing compound and ensures improved adhesion between the fibres of the paper and the compound.

If both sides of the paper are to be coated or infused the paper is passed from the dryers through a bath of the composition maintained at a temperature of from 425° F. to 475° F. Agitation is applied to the bath to maintain the ingredients thereof in a thoroughly mixed condition. The amount of proofing agent with which the paper is infused may be regulated by controlling the temperature of the bath and the length of time the paper is immersed in the bath.

As it emerges from the treating bath, the paper is preferably passed between two doctors which serve to remove surplus proofing material and to effect a smooth uniform distribution of the film. The use of electrically heated doctors provided with rounded working edges has been found to ensure an exceptionally uniform distribution of the applied proofing material and is recommended. These doctors should be adjustably mounted so that their angle of contact may be varied to give different results. In general, the composition and temperature of the coating bath, the length of time the paper is immersed in the bath, and the arrangement of the doctors should be such as to provide a treated sheet containing from 20% to 35% of the proofing compound.

If it is desired to apply the proofing compound to one surface only of the paper, this may be accomplished by passing the paper over a contacting coating roll partly submerged in the coating bath.

Paper coated on both sides in accordance with this invention is not saturated throughout with the proofing material but has the non-infused central layer characteristic of paper which has been coated on both sides by the process described in U. S. Patent 1,667,691. Similarly, paper coated on one side in accordance with this invention presents a clean and non-infused layer on the opposite side.

As applied to the manufacture of proofed kraft papers the invention is further illustrated by the following examples:

EXAMPLE 1

This example serves to illustrate characteristic chemical and physical properties of 45 pound kraft paper coated with a plasticised resin-asphalt wax compound having the following formula:

|  | Per cent |
|---|---|
| Mineral rubber | 79 |
| Coumarone indene resin | 12 |
| Methyl ester of rosin | 2 |
| Paraffin wax | 6 |
| Copper naphthenate | 1 |

The coating was carried out at a coating temperature of 425° F. and the surplus coating doctored off as previously described. In this case the finished product contained 28% by weight of the coating material and exhibited good fungicidal properties.

Test results

| | | |
|---|---|---|
| Bs. weight—plain | pounds | 45 |
| Bs. weight—coated | do | 65.5 |
| Mullen | per cent | 128 |
| Caliper | | 5.07 |
| Tear | grams | 84.68 |
| Densometer | hours over | 64 |
| Bulk | | 86 |

Water-vapor transmission measured in grams per 100 square inches per 24 hours per 100° F., 95% R. H. (relative humidity):

| | | |
|---|---|---|
| Flat | grams | 0.29 |
| Creased | do | 0.45 |

Water resistance (dry indicator test method):

| | | |
|---|---|---|
| Flat | hours | 68 |
| Creased | do | 28 |

EXAMPLE 2

This example serves to illustrate characteristic chemical and physical properties of 60 pound kraft paper coated with a plasticised resin-asphalt wax compound having the following formula:

|  | Per cent |
|---|---|
| Mineral rubber | 79 |
| Coumarone-indene resin | 12 |
| Hydrogenated methyl ester of rosin | 3 |
| Paraffin wax | 5 |
| Copper naphthenate | 1 |

In this case the paper was coated at a coating temperature of 450° F. and the finished product contained 30% by weight of the coating material and exhibited good fungicidal properties.

Test results

| | | |
|---|---|---|
| Bs. weight—plain | pounds | 60 |
| Bs. weight—coated | do | 86 |
| Mullen | per cent | 93 |
| Caliper | | 6.75 |
| Bulk | | 80 |
| Tear | grams | 127.87 |
| Densometer | hours | 51 |

Water resistance (dry indicator test method):

| | | |
|---|---|---|
| Flat | hours | 72 |
| Creased | do | 24 |

Water-vapor transmission measured in grams per 100 square inches per 24 hours per 100° F., 95% R. H. (relative humidity):

| | | |
|---|---|---|
| Flat | grams | 0.35 |
| Creased | do | 0.95 |

Flexibility test (J. A. N. P.—125)

grams__ 200–250

EXAMPLE 3

This example serves to illustrate characteristic chemical and physical properties of 105 pound kraft paper coated with a plasticised resin-asphalt wax compound having the following formula:

|  | Per cent |
|---|---|
| Mineral rubber | 78 |
| Coumarone-indene resin | 12 |
| Methyl ester of rosin | 4 |
| Paraffin wax | 5 |
| Copper naphthenate | 1 |

The coating operation was carried out at a coating temperature of 475° F. and the finished product contained 25% by weight of the coating material and exhibited good fungicidal properties.

Test results

| | | |
|---|---|---|
| Bs. weight—plain | pounds | 105 |
| Bs. weight—coated | do | 145 |
| Mullen | per cent | 92 |
| Caliper | | 12.15 |
| Bulk | | 83 |
| Tear | grams | 352.332 |
| Densometer | hours over | 180 |

Water resistance (dry indicator test method):
  Flat _____ hours__ 72
  Creased _____ do____ 22

Water-vapor transmission measured in grams per 100 square inches per 24 hours per 100° F., 95% R. H. (relative humidity):
  Flat _____ grams__ 0.29
  Creased _____ do____ 0.81

Flexibility test (J. A. N. P.—125)
  _____ grams__ 500–650

At this point it may be noted that, as applied to the manufacture of coated papers, the present invention also enables a higher percentage of the coating composition to adhere to the paper with less brittleness as compared with papers coated in accordance with U. S. Patent 1,667,691.

Having thus described the nature and application of my invention it will be understood that various modifications may be resorted to within the scope and spirit of the invention as defined by the appended claims.

I claim:

1. As a new article of manufacture, a kraft paper sheet having at least one side thereof coated with a non-infused continuous, flexible, water-vapor resistant film of a coating composition which withstands creasing and folding without rupture or cracking; retains its flexibility at temperatures substantially below sub-zero; is characterized by exceptionally low water-vapor transmission and withstands prolonged exposure to weather, fumes and alcohol without appreciable deterioration and is non-blocking, said composition containing as essential body-forming constituents in total amount at least about 99% by weight of the composition from 50% to 80% of asphalt mineral rubber products having a melting point of from 320° F. to 350° F., from 10% to 25% of a coumarone indene resin consisting of a mixture of polymerized coumarone and polymerized indene, said coumarone and indene obtained from solvent naphtha fractions of coal tar at 280° F. to 340° F., from 2% to 10% of a rosin plasticizer selected from the group consisting of methyl ester of rosin and hydrogenated methyl ester of rosin, from 4% to 7% of paraffin wax having a melting point between 122° F. and 150° F.

2. A new article of manufacture as set forth in claim 1, in which said composition includes from 0.5% to 1% copper naphthenate as a fungicide.

ALEXANDER SZWARC.

REFERENCES CITED

The following references are of record in the file of this patent:

UNITED STATES PATENTS

| Number | Name | Date |
|---|---|---|
| 1,667,691 | Reid | Apr. 24, 1928 |
| 1,684,873 | Lord | Sept. 18, 1928 |
| 1,849,867 | Eckert | Mar. 15, 1932 |
| 1,988,178 | Merrill | Jan. 15, 1935 |
| 2,119,509 | Barnhart | June 7, 1938 |
| 2,346,947 | Schlaanstine | Apr. 18, 1944 |
| 2,423,555 | Ender | July 8, 1947 |